United States Patent [19]
Stein et al.

[11] Patent Number: 5,796,541
[45] Date of Patent: Aug. 18, 1998

[54] SERVO TRACK WRITING MEASUREMENT OF GAPPED INITIAL CLOCK TRACK TO WRITE FULL CLOCK TRACK

[75] Inventors: Anatoly Stein, Los Altos; Alexander Tesler; Dimitry Varsanofiev, both of Palo Alto, all of Calif.

[73] Assignee: Guzik Technical Enterprises, Inc., San Jose, Calif.

[21] Appl. No.: 561,468

[22] Filed: Nov. 21, 1995

[51] Int. Cl.$^6$ .................... G11B 20/14; G11B 5/012
[52] U.S. Cl. ............................ 360/75; 360/77.08
[58] Field of Search .................. 360/51, 50, 48, 360/71, 72.1, 77.08, 77.11, 75, 53; 329/97.01, 307, 325

[56] References Cited

U.S. PATENT DOCUMENTS

| | | | |
|---|---|---|---|
| 3,540,022 | 11/1970 | Berger | 340/174.1 |
| 3,831,191 | 8/1974 | Gold | 360/22 |
| 4,131,920 | 12/1978 | Berger | 360/51 |
| 4,639,863 | 1/1987 | Harrison et al. | 360/97.01 |
| 4,972,396 | 11/1990 | Ratner | 369/33 X |
| 4,996,608 | 2/1991 | Widney | 360/51 |
| 5,146,183 | 9/1992 | Wilson | 360/77.08 X |
| 5,153,788 | 10/1992 | Nishikawa et al. | 360/77.08 |
| 5,257,294 | 10/1993 | Pinto et al. | 329/325 |
| 5,333,140 | 7/1994 | Morary et al. | 360/75 X |
| 5,339,204 | 8/1994 | James et al. | 360/51 |
| 5,416,652 | 5/1995 | Lewis | 360/48 |
| 5,422,760 | 6/1995 | Abbott et al. | 360/46 |
| 5,448,429 | 9/1995 | Cribbs et al. | 360/75 |
| 5,485,322 | 1/1996 | Chainer et al. | 360/51 |
| 5,613,088 | 3/1997 | Achiwa et al. | 360/53 X |

OTHER PUBLICATIONS

HP 5372A Frequency And Time Interval Analyzer Operating Manual, pp. 1-1 to 1-55 (Hewlett Packard Co., Palo Alto, CA 1989).

*Primary Examiner*—Aristotelis M. Psitos
*Attorney, Agent, or Firm*—David Pressman; John S. Heyman

[57] ABSTRACT

An apparatus for servo track writing on a magnetic medium comprises a clock head (12) and a regular head (14). The regular head (14) writes an initial approximation of the clock track so as to leave a small gap between the last written pulse of the clock track and the first pulse of the clock track. Then this gap is measured by gap measurement system (33) and the frequency of clock track is updated using a direct digital synthesis system (35) so as to fill a full clock track during the next writing. The initial clock track is read by regular head (14) and its output signal is supplied to a phase locked loop. The output of the phase locked loop drives a direct digital synthesis system (35), which generates a modified frequency on its output. A signal of this frequency, in turn, is supplied to the clock head (12), which writes a new improved clock track on the disk. The resulting clock track closure is determined by instability of disk rotational speed at the gap interval and can be made less than 1 ns after five disk revolutions.

19 Claims, 3 Drawing Sheets

SERVO TRACK WRITING MEASUREMENT OF GAPPED INITIAL CLOCK TRACK TO WRITE FULL CLOCK TRACK

BACKGROUND

1. Field of Invention

The present invention relates to the field of magnetic writing and reading of information, particularly to a method and apparatus for servo track writing on magnetic disks.

2. Description of Prior Art

Disk drives are magnetic data storage devices having one or several flat magnetic disks or media with a common axis of rotation. Information is stored on the disks in circular tracks and is written and read from the disks using magnetic read-and-write heads.

During the writing process, an alternating current is supplied to the head and causes magnetic field changes in the region adjacent to the head. These changes of the magnetic field, in turn, cause changes in magnetization of the magnetic medium adjacent the head. As the magnetic disk rotates, the magnetized area on the disk forms a circular track of changing magnetization. These changes of magnetization remain stored on the disk unless they are overwritten when new information is recorded. The whole surface of the magnetic disk is utilized by moving the magnetic head to different radial positions and writing respective tracks at the positions. These tracks are separated by a distance sufficient to insure that the information written on adjacent tracks will not interfere or be destroyed during the writing and reading processes.

During the reading process, the magnetic head is positioned over a selected track of information. Each change in magnetization, previously written and stored on the medium, induces a voltage pulse in the reading head arid these pulses are detected and decoded by disk drive circuitry, resulting in reading the information from the disk.

In order to position the magnetic head over a particular track of information, the head is moved in a radial direction over the disk. However, the physical width of a track in modem disk drives may be as small as 2.5 microns (100 microinches). Thus precise positioning of the magnetic head over the disk with such a high resolution becomes extremely difficult. Moreover, even during moderate changes of ambient temperature, the magnetic disk itself experiences thermal expansions and contractions which may exceed the track size. Therefore, accurate positioning of the head to a particular track becomes impossible without the use of additional feedback information, also known as servo information.

Servo information comprises special data, permanently recorded on the magnetic disk during disk drive manufacturing. Servo information contains reference signals, which aid in determining the current head position. The servo signals are separated from normal data. When the magnetic head is positioned over any location of the disk, it reads and decodes the servo signals, containing a reference to the current head position. Based on these servo signals, special control signals are sent to an actuator which repositions the head more accurately over the magnetic medium. Further precise radial positioning is dervied from an error signal determined by the relative amplitude of the servo signals from two or more adjacent servo tracks.

Different types of servo systems are used in modem disk drives and are described in U.S. Pat. No. 5,142,652 to Martin A. Lewis (1995). In one system, described by Lewis, one

2 disk surface is used exclusively for servo information. During disk operation, a specially dedicated servo head constantly reads this information to provide continuous positioning information for the rest of the heads used in the disk drive.

A different type of the servo system, described by Lewis, uses servo information written in a specially selected part of the information track. This type of servo system is also called a sector servo. Before reading or writing normal data, a magnetic head reads and decodes servo information on each track.

Because of the high accuracy necessary for writing of servo information, writing of servo information is an important step in the disk drive manufacturing. Conventionally the servo information is written before assembling and sealing the disk drive, and a special high precision servo-writing apparatus is used for this purpose.

The first and the most critical step in writing servo information onto the disk surface is writing a circular clock track, consisting of a repetitive pattern of transitions, each of the transitions indicating an angular position around the disk. The rest of servo information is always written synchronously with the clock track. This is done by reading the clock track information and writing servo information at a new radius in synchronism with the timing of transitions at the clock track.

A predetermined number N of transitions must be written on the clock track, providing exactly N angular positions. A typical value of N could be, for example, 500,000. For example, if a rotational speed V of the disk is 3600 rotations per minute (rpm) or 60 rotations per second, the time of a single disk revolution is $t_r=16.666$ msec. Time T, during which a single transition on the clock track is written, will be $T=t_r/N$ or 33.33 nanoseconds. This time determines the frequency of the clock track $f=1/T=N/t_r$, or 30 MHz for the above case.

In reality, however, accurate writing of the clock track is difficult due to the instability of the disk rotational speed. A typical instability of the spindle rotational speed is about $10^{-3}$. This means, assuming $t_r=16.666$ msec, that the period of the revolution varies by at least ±8 microseconds. This value transforms into approximately 240 extra or missing transitions on the clock track, which is not acceptable for the required accuracy of the system. A typical accuracy required for the clock track is at most 20–30 ns between the last and the first transitions on the track.

The described problem is also referenced to as a "closure" problem because extra or missing transitions may appear on the clock track. This closure problem is illustrated in FIG. 1, which shows a clock track C on a disc. An empty part of the track (unhatched area from E to S) is not marked, while the written portion of the clock track (from S to E) is hatched. Only the hatched part of track C is filled by N transitions, leaving the empty (unhatched) space on the track between the last or end clock transition E and the first or starting clock transitions. It is also possible that the N transitions may occupy more than one track circle (not shown), overlapping the transitions written at the end of the clock track with the transitions, written at the start of the track.

Several approaches have been used in the prior-art servo-track writers as disclosed by U.S. Pat. No. 3,540,022 (1970) and 4,131,920 (1978) to James K. Berger and 5,339,204 to David T. James, Anthony W. Leonard, and Peter J. Elliot (1994). These patents describe servo writers which are based upon a trial-and-error technique for clock track writing, also referenced to as a Monte Carlo technique. In this method the clock track is written with the required fixed transition frequency f. After writing of a clock track, it is checked against a required number of transitions N and a distance $t_c$ between the last and the first transition. If N transitions are detected on the clock track and $t_c$ is less than a required closure accuracy, the current clock track is considered to be successfully written; otherwise the clock track is written again. This method utilizes a random nature of the spindle oscillations and assumes that eventually an acceptable clock track will be written.

The method of trial-and-error writing requires long time before an appropriate clock closure accuracy is achieved. This procedure may take from 20 seconds to more than one minute, depending upon the spindle rotational instability. During mass-scale production of disk drives, the duration of the clock writing procedure introduces significant delays in drive manufacturing and slows the production procedure. Moreover, clock track closure accuracy obtained using this method cannot be guaranteed.

Another approach to servo track writing has been disclosed in U.S. Pat. No. 5,416,652 to Martyn A. Lewis (May. 5, 1995). In the method proposed by Lewis, a clock track is written in consecutive cycles so that certain number M of groups of transitions, called frames, are written. At a first step, M/2 frames are written, covering approximately one half of the clock track. Then, a distance L1 between the last written transition and the start of the clock track is measured. The frequency of the clock is changed to accomodate the current variation of the rotational speed of the drive so as to fit the residual M/2 frames exactly into gap L1. As a second step, another M/4 frames are written with the new frequency and the new gap L2 (which is about 25% of the track) is measured again. The frequency of the clock is again updated so as to fit the residual M/4 frames into gap L2. Then, another M/8 frames are written with the new frequency and the procedure is again repeated, etc. As is shown by Lewis, after approximately 20 disk revolutions, the closure of the clock track with an accuracy of ±30 ns will be achieved and a typical time required to complete clock writing will not exceed 0.33 sec.

Several disadvantages of the method of clock track writing proposed by Lewis are relatively low accuracy of the final track closure and long writing time required to provide a high accuracy clock track. Indeed, while a clock track closure of approximately 30 ns will be achieved in 20 disk revolutions, improved accuracy may require several hundred disk revolutions. Another disadvantage of this method is that the accuracy of the closure depends upon the character of disk spindle-motor speed variations. Estimates presented by Lewis indicate that the overall accuracy of the method depends upon the variation of spindle motor speed between two consecutive revolutions and achievement of the improved clock track accuracy may require several seconds.

Objects and Advantages

It is accordingly an object of the invention to provide a method and apparatus for servo clock track writing which is fast, reliable, which guarantees high accuracy clock track closure, and which is independent of spindle motor speed variations. Other advantages and features of the invention will be better understood after the consideration of the ensuing description with reference to the accompanying drawings.

DRAWINGS

REFERENCE NUMERALS

10—magnetic disk
12—clock head
14—regular head
16,18—read-write amplifiers
20—reference crystal oscillator
22—read data multiplexer
24—phase detector
25,27—programmable dividers
29—integrator
31—voltage control oscillator
33—gap measurer
35—direct digital synthesizer
37—switching circuit
39—control circuit

SUMMARY

In accordance with the invention, an apparatus for servo track writing has two heads, each capable of writing and reading information on a magnetic disk. One head writes an initial approximation of a clock track so as to leave a small gap between the last and the first written pulses of the clock track. Then this gap is measured and the frequency of the clock track is updated using a direct digital synthesis system so as to fill a full clock track during next writing. The initial clock track is read by one head and its output signal is supplied to a phase locked loop. An output of phase locked loop drives the direct digital synthesis system, which generates a modified frequency at its output. This frequency, in turn, is supplied to a second head which writes a new improved clock track on the disk. A resulting clock track closure is determined by the instability of disk's rotational speed at the gap interval and can be made less than 1 ns after 5 disk revolutions.

Figure 2:
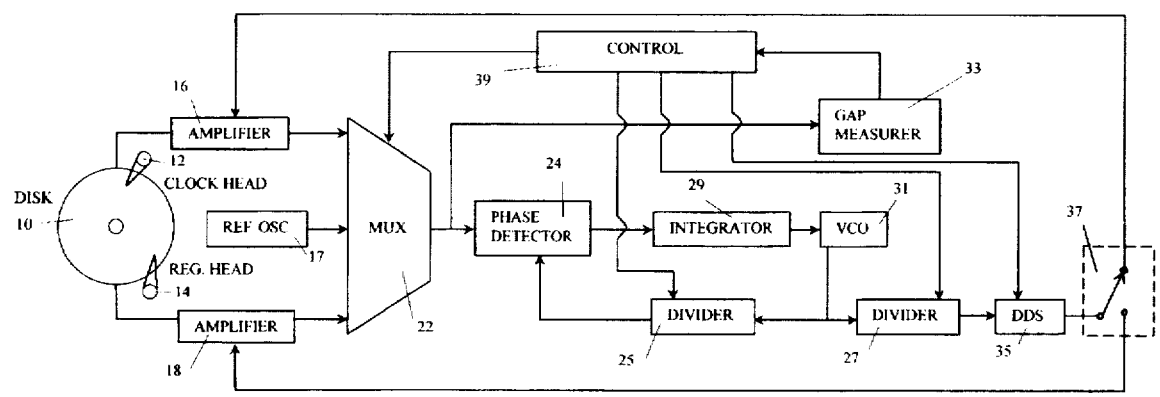
FIG. 2 is a view of a servo writer of the present invention.

FIG. 2—Clock Track Writer of the Invention

An apparatus suitable for the realization of the invention is schematically shown in FIG. 2 in block diagram form. The apparatus consists of a rotating magnetic disk 10, a clock head 12 capable of writing and reading information to and from magnetic disk 10, and a regular head 14, also capable of writing and reading information from and to disk 10. The relative positions of heads 12 and 14 are irrelevant; for example, they can be positioned 180° apart. Radial movement of heads 12 and 14 need not be synchronized as the tracks of information they are writing are completely independent. Clock head 12 is connected to a first read-write amplifier 16 and head 14 is connected to a second read-write amplifier 18. Amplifiers 16 and 18 and a reference crystal oscillator 17 have outputs which are supplied to the inputs of a read data multiplexer 22.

Read-write amplifiers 16 and 18 amplify input signals. In one preferred embodiment, the amplification was 40 dB. An electrical signal from heads 12 and 14 is supplied to the input of read-write amplifiers 16 and 18 and their outputs constitute amplified signals. Reference crystal oscillator 17 generates a sinusoidal voltage at its output, preferably of 50 MHz.

A read data multiplexer 22 receives three signal inputs from amplifiers 16 and 18 and oscillator 17. It also receives a control input from a control unit 39, discussed infra. This control signal is a binary signal, generated by control unit 39. One of the three signal inputs will be supplied to the output.in accordance with the control signal. If a zero signal is supplied to the control input, the signal input from head 12 will be supplied to the output. If the control signal equals one, the signal input from oscillator 17 will be supplied to the output. If the control signal equals two, the signal from head 14 will be supplied to the output. An example of such multiplexer is model 10EL57, produced by Motorola Inc., P.O. Box 20912, Phoenix, AZ 85036.

The output of multiplexer 22 is connected to the input of a gap measurement device 33 and is also supplied to a first input of phase detector 24. A second input of the phase detector is taken from the output of a programmable divider 25. An output of phase detector 24 is connected to an input of an integrator 29. In turn, an output of integrator 29 is connected to an input of voltage controlled oscillator (VCO) 31. The output of oscillator 31 is used as an input for a first programmable divider 25 and a second programmable divider 27. Preferably VCO produces an output from 200 MHz to 400 Mhz, depending upon its input voltage.

Phase detector 24 detects phase difference between its two input signals so that the signal on its output is proportional to this phase difference. The larger the phase difference between the two inputs of phase detector 24, the larger voltage level is generated on the output. For example, if phase difference between input signals is 45 degrees, the output signal of phase detector equals 250 mV. For a phase difference of 90 degrees, this signal will reach 500 mV.

VCO 31 generates at its output a signal whose frequency is dependent upon its input signal. The larger the voltage level on the input of oscillator 31, the higher the value of generated frequency on its ouput.

Each of programmable dividers 25 and 27 divides the frequencies of its input signal so that the signal on its output constitutes a signal with reduced frequency. This reduced frequency is an input frequency of the divider divided by the programmed division coefficient. For example, if input frequency of the divider is 500 MHz and the division coefficient equals to 5, the output frequency of the divider equals 100 MHz.

Phase detector 24, integrator 29, VCO 31, and programmable dividers 25 and 27 constitute a phase locked loop (PLL) and are standard modules which are produced by different companies. For example, PLL module Q3036 is produced by Qualcomm Inc., 10555 Sorrento Valley Road, San Diego, CA 92121 and includes all the described modules.

An output of programmable divider 27 is supplied to a signal input of a direct digital synthesis (DDS) unit 35. Unit 35 receives an signal input on its left side and a control input on its upper side. Based upon the value of the control input, unit 35 transforms frequency of the signal input into a signal with a programmable frequency on its output. Such systems are well known. For example, direct digital system module Q2334 is produced by Qualcomm Inc., supra. An output of system 33 is switched, by a switching circuit 37, between the inputs of amplifiers 16 and 18.

Gap measurement module 33 measures a specified time interval between a pair of sequential pulses on its input. After a pair of sequential pulses has arrived on its input, the output of module 33 contains a value equal to the time interval between this pair of pulses. This module is, for example, an HP E1725A Time Interval Analyzer, produced by Hewlett Packard Co., 3000 Hanover Street, Palo Alto, California 94304.

Control unit 39 has an input which receives signals from the output of gap measurement module 33. Control unit 39 has outputs connected respectively to the control inputs of read data multiplexer 22, programmable dividers 25 and 27, and direct digital synthesis unit 35. Control input of multiplexer 22 is switched in sequence so that its output represents, in sequence, the signals from control oscillator 17, clock head 12, and regular head 14. Control unit 39 calculates values of frequency division coefficients for dividers 25 and 27. These values are determined by the ratio between the frequencies of the clock track and the working frequencies of oscillator 31 and synthesis unit 35. For example, if the frequency of clock track is 40 MHz, the frequency of oscillator 31 is 200 MHz, and the frequency of unit 35 is 50 MHz, then the coefficient of programmable divider 25 should be set to 200/40=5 and the coefficient of programmable divider 27 should be set to 200/50=4. Based upon the output value of the gap measurement unit 33, control unit 39 sets the coefficient for DDS unit 35. The calculation of this coefficient is described in detail in the next section. Control unit 39 thus generates on its output, digital signals which program coefficients to dividers 25 and 27 and to DDS unit 35. Control unit 39 preferably is a special digital signal processor, model DSP TMS320750, produced by Texas Instruments, P.O. Box 655303, Dallas, Tex. 75265-5303. This unit requires special programming. The listing of the corresponding program is provided below in the macrocode programming language.

Figure 1:
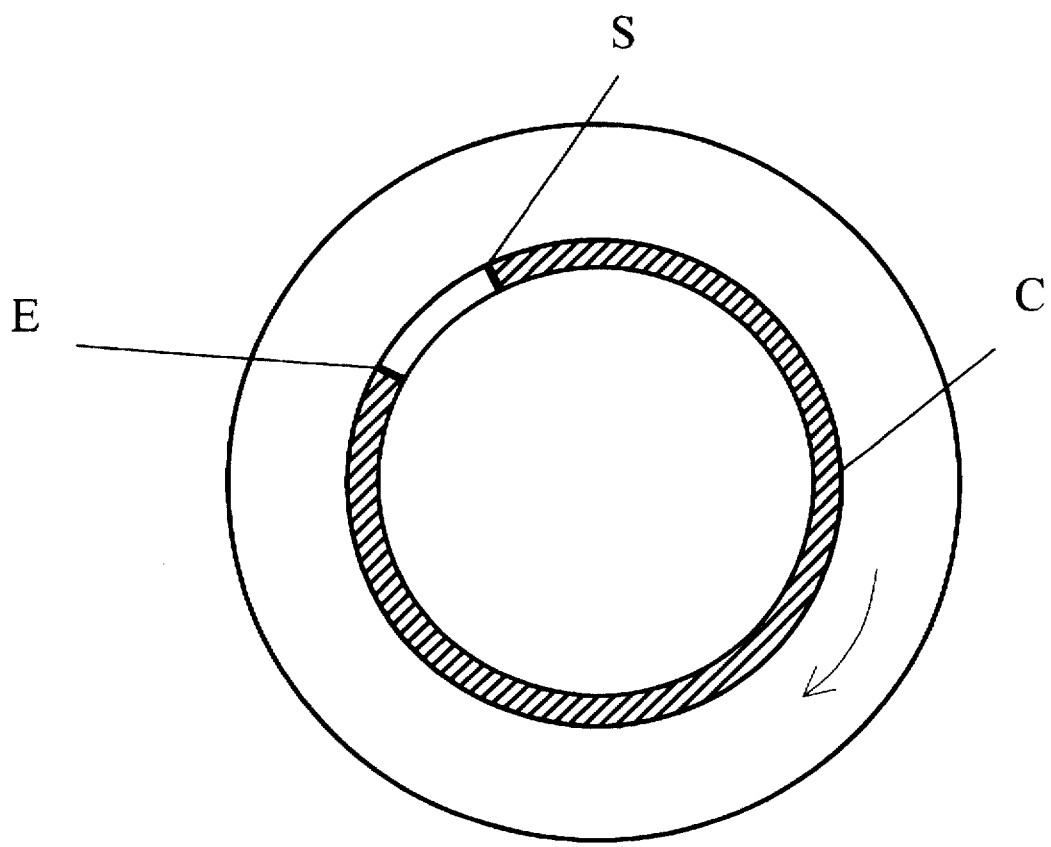
FIG. 1 is a schematic representation of a magnetic disc with a recorded prior-art clock track illustrating the closure problem.
Figure 3:
FIG. 3 is a schematic representation of a clock track of the present invention written as a first step of operation.

% Program Parameters
% N—number of pulses on clock track
% A—control input value of multiplexer 22
% D1—coefficient of divider 25
% D2—coefficient of divider 27
% K—coefficient of DDS 35
% f0—frequency of clock track
% f1 frequency of oscillator 17
% f2—frequency of VCO 31
% f3—frequency of DDS 35
% GEn—gap measurement enable for Gap measurement sysem 33
% G—gap value
% revolution—number of revolution
Start read revolution while revolution<3, if revolution=1,
  A=1
  D1=f2/f1
  D2=f3/f2
  K=f0/f3 if revolution=2,
  A=0
  GEn=1
  read G if revolution=3
  A=2
  D1=f2/f0
  D2=f3/f2
  K=N/(N+Gf0)
End
End
FIGS. 2 and 3—Operation FIG. 3 illustrates the clock track of FIG. 1 in linear form, for ease of illustration. The operation of the clock track writer is started by positioning a disc 10 on the drive and moving heads 12 and 14 over a selected track.

At a first disk revolution an initial approximation of the clock track has to be written so as to guarantee a gap G (size exaggerated) between the last pulse on the clock track and the start of the clock track, as illustrated in FIG. 3. This is done by control unit 39 which generates a set of control signals and supplies them to programmable dividers 25 and 27, DDS unit 35, and to multiplexer 22.

To guarantee gap G, the clock track is written with an approximate frequency $f_0$. This frequency is preset by control unit 39 which is sending the appropriate control signals to programmable dividers 25 and 27, to DDS unit 35, and to read data multiplexer 22. Frequency $f_0$ is calculated based upon the knowledge of the disk rotational speed and number of pulses N to be written on the clock track. For example, if a rotational speed of the disk is V, the time of a single disk revolution is $t_r=1/V$. Time T, during which a-single transition on the clock track is written will be $T=t_r/N$. This time determines the frequency of the clock track $f_0=1/T=N/t_r$. A guaranteed small gap is left between the last pulse of the clock track and the first pulse of the clock track. The size of this gap is chosen to be larger than the maximum possible gap caused by the spindle instability. To leave this gap, for example, equal to 1% of the track, the frequency $f_0$ is chosen 1% higher than its calculated value. Alternatively, the calculated value of $f_0$ can be maintained and a smaller number of pulses, say N–M pulses can be written instead of N pulses. For example, M=N/100 and total number of N–N/100 pulses can be written on the track.

To perform writing of the inital approximation of the clock track, control unit 39 sends appropriate control signals to programmable dividers 25 and 27, to DDS unit 35, and to read data multiplexer 22. Required frequency $f_0$ is obtained from the frequency of oscillator 17 by supplying its output through multiplexer 22 to phase detector 24, integrator 29, and VCO 31. Since the input signal to phase detector 24 is supplied from oscillator 17, the output of oscillator 31 constitutes a sine wave signal with a frequency proportional to the frequency of oscillator 17.

For example, if the frequency of oscillator 17 equals 50 MHz and $f_0$=50.5 MHz, then the coefficient of DDS unit 35 is equal to 50.5/50=1.01.

The output of oscillator 31 is supplied through divider 25 to the second input of phase detector 24. The same output of oscillator 31 is also supplied to divider 27. The output of divider 27 is supplied to the input of DDS unit 35.

A sine wave signal with frequency f0 passes through switching circuit 37; which, as stated, is connected to read-write amplifier 18. The sine wave signal is amplified in amplifier 18 and is supplied to head 14. As a result, a track of clock information with a gap G is written by head 14.

At the next disk revolution the clock track writer measures length of gap G between the last written clock pulse and the first pulse of the clock track. This is done by control unit 39 which generates a set of control signals and supplies them to multiplexer 22 and gap measurement unit 33.

During the gap measurement operation, head 14 reads the signal from magnetic disk 10 and sends it to amplifier 18. Amplifier 18 amplifies the signal and passes to the output of read data multiplexer 22. Control unit 39 sends a ccontrol signal to multiplexer 22 causing the output of the multiplexer to be supplied to the input of gap measurement unit 33. Unit 33 measures the time interval G between the last clock pulse written on the clock track and the first pulse of the clock track. The operation of unit 33 may be based, for example, on timing interval measurement techniques well known in the art. For example, a number of high frequency pulses of known frequency can be counted between the pair of consecutive input pulses and the obtained number gives an estimate of elapsed time interval. Such-prior-art timing interval measurements are, for example, described in Hewlett Packard HP5372A Frequency and Time Interval Analyzer, Reference Manual, Hewlett Packard Company, supra.

Once gap interval G is measured, its value is supplied from the output of unit 33 to the input of control unit 39. Unit 39 calculates a frequency correction coefficient K so that frequency $f_1=K*f_0$ will provide an ideal clock track closure when writing N clock pulses on the clock track. For example, assume that N pulses have been written on the clock track with frequency $f_0$ and the measured gap value is G. In this case a period between the clock track pulses is $T_0=1/f_0$ and N pulses occupy a timing interval equal to $NT_0$. A new frequency $f_1=1/T_1$ should cover full the clock track. Therefore, $NT_1=NT_0+G$. From here $f_1=Nf_0/(N+Gf_0)$ and the coefficient $K=N/(N+Gf_0)$.

At the third consecutive disk revolution the original approximation of the clock track written on disk 10 with frequency $f_0$ is read by head 14. This is done by generating a set of control signals in control unit 39 and sending them to programmable dividers 25 and 27, DDS unit 35, and to multiplexer 22. During this operation the signal read by head 14 is amplified by amplifier 18 and passed through multiplexer 22. Control unit 39 supplies the control signal to the control input of multiplexer 22 causing the signal from the output of multiplexer 22 to be applied to the input of phase detector 24. The signal from the output of phase detector 24 is integrated in integrator 29 and is applied to the input of VCO 31. The signal from oscillator 31 is applied to the inputs of programmable dividers 25 and 27. A signal from the output of divider 25 is applied to the second input of phase detector 24.

During this disk revolution, instabilities of the disk rotational speed are different from the instabilities present during writing initial clock track at first disk revolution. These instabilities create modulation of clock track frequency $f_0$ which thus changes with time t and is described by time dependent function $f_0(t)$. These timing variations of $f_0(t)$ are tracked by the PLL consisting of phase detector 24, integrator 29, VCO 31, and programmable divider 25. Detector 24 detects phase difference between its two input signals so that the signal on its output is proportional to this phase difference. Divider 25 divides the frequencies of its input signal so that the signal on its output has reduced frequency. This reduced frequency is an input frequency of the divider divided by the programmed division coefficient. Oscillator 31 generates at its output a signal with frequency dependent on its input signal. As the result of the PLL's operation, the signal on the output of oscillator 31 follows the current instantaneous frequency $f_0(t)$.

The signal from oscillator 31 is then applied to the input of programmable divider 27 and from the output of programmable divider 27 to the input of DDS unit 35. The signal on the output of unit 35 constitutes a time-varying frequency $f_1(t)=Kf_0(t)$. This signal is supplied via switching circuit 37 to amplifier 16 and to clock head 12, which writes a new clock track simultaneously with the read operation of head 14.

Until the last pulse of the original clock track, the frequency of the new clock track is given by $f_1(t)=Kf_0(t)$. Assuming that the gap of the original clock track starts at time $t_g$, the frequency of the new clock track, starting from time $t_g$ and until the end of the revolution, is locked to the value of $f_1(t_g)=Kf_0(t_g)$. The instability of the disk rotational speed during gap interval G is not known. Thus some errors may occur at this time interval. However, assuming instability of the rotational speed is on the order of magintude of about $10^{-3}$, the accuracy of the clock track closure after the third step is determined only by the length of the gap. Assuming the gap length is about 2 μs, this gives at most a 2 ns accuracy of the clock track closure. As a result of the third step of operation, an accurate new clock track is written on disk 10 by clock head 12.

The accuracy of the obtained clock track may be additionally improved. Indeed, a small fraction G1 of gap G may be intentionally left empty in the new clock track written at the third step. This can be done by causing control unit 39 to send a set of control signals to programmable dividers 25 and 27, DDS unit 35, and multiplexer 22, similar to that generated during first revolution of the disk.

The empty fraction is now measured during the fourth revolution of the disk in a manner similar to that described above. Synthesis system 35 is now reprogrammed by control unit 39 to provide a frequency correction coefficient of $K1=N/(N+G1f_1)$. Then, at next step, the clock track obtained during the third step is read by clock head 12. The signal from head 12 is amplified by amplifier 16, supplied at the output of multiplexer 22 to the input of phase detector 24, integrator 29, VCO 31, and, through programmable divider 25, to a second input of phase detector 24. The output of oscillator 31 is applied through divider 27 to DDS unit 35.

At the output of unit 35, a signal with a frequency $f_2(t)=K1f_1(t)$ is generated. This signal is applied through switching circuit 37 to amplifier 18 and head 14, which writes another clock track. In a manner similar to described above, closure of this clock track obtained after the fourth disk revolution is determined by the length of gap G1. If this length is on the order of 0.5 µs, then accuracy of clock track closure after fourth step can be easily made less than 500 ps.

Therefore, by measuring the gap of the clock track and rewriting it with a modified frequency, the clock track closure with accuracy better then 1 ns can be achieved after five disk revolutions, or approximately 100 ms.

SUMMARY, RAMIFICATIONS, AND SCOPE

Thus the method and apparatus of the invention can write a servo clock track with a guaranteed high accuracy closure which is achieved during several disk revolutions and which does not depend upon spindle motor speed variations.

While the apparatus has been shown and described with reference to specific embodiments, it is not limited to these embodiments. For example, more than two heads may be used for writing and reading information on disk 10. Different specific realizations of phase detector 24, integrator 29, and VCO 31 are possible. Different realizations of gap measurement device 33 are also possible. Modifications of the method of the invention are also possible. For example, at a first step of operation a gap between the end and the start of the initial approximations of clock track can be left by either increasing the frequency of recording or by writing smaller number of pulses on the track. Therefore, the scope of the invention should be determined, not by the given examples, but by the claims and their legal equivalents.

What is claimed is:

1. A method of writing a reference clock track on a rotating magnetic medium having tracks for reading and writing information, comprising the steps of:

providing a servo track writer having at least a first read-write head and a second read-write head for reading and writing information on said medium;

selecting a track on said medium, said track having a write starting point and writ ending point;

writing clock information on said selected track by said first read-write head during a first revolution of said medium at a predetermined initial frequency of said clock information so that an unwritten portion is left between said write starting point and said write ending point on said track;

measuring the length of said unwritten portion on a second revolution of said medium to obtain measurement data;

converting said measurement data into a frequency correction coefficient;

reading during a third revolution said clock information written on said first revolution of said medium by said first read-write head, said clock information having a current frequency; and using the information read by said first read-write head and said frequency correction coefficient for writing new clock information by said second read-write head on a given track of said medium simultaneously with said reading step performed by said first read-write head so that a new reference clock track may be accomplished within as low as three revolutions of said rotating magnetic medium and independent of a motor speed.

2. The method of claim 1 wherein said step of using the information read by said first read-write head on said given track of said medium simultaneously with said reading step performed by said first read write head comprises:

tracking said current frequency on said given track of said medium;

modifying said current frequency using said frequency correction coefficient, thus obtaining a modified frequency;

supplying said modified frequency to said second read-write head simultaneously with said reading step performed by said first read-write head; and writing a new clock information by said second read-write head on said given track of said medium simultaneously with said step of reading the clock information performed by said first read write head.

3. The method of claim 2 where said tracking is performed by a phase locked loop device.

4. The method of claim 3 where said rotating medium is a magnetic disk.

5. The method of claim 2 where said modifying is performed by a direct digital synthesis unit.

6. The method of claim 5 where said rotating medium is a magnetic disk.

7. A method of writing a reference clock track on a rotating medium having tracks for reading and writing information, comprising the steps of:

providing a servo track writer having at least a first read-write head and a second read-write head for reading and writing information on said medium;

selecting a track on said medium, said track having a write starting point and write ending point;

writing a clock information on said selected track by said first read-write head during one revolution of said medium at a predetermined initial frequency of said clock information so that an unwritten portion is left between said write starting point and said write ending point on said track;

measuring the length of said unwritten portion on a subsequent revolution of said medium to obtain measurement data;

converting said measurement data into a frequency correction coefficient;

reading during a third revolution said clock information written on said one revolution of said medium by said first read-write head, said clock information having a current frequency;

tracking said current frequency on said given track of said medium;

modifying said current frequency using said frequency correction coefficient, thus obtaining a modified frequency;

supplying said modified frequency to said second read-write head simultaneously with said reading step performed by said first read-write head; and writing new clock information by said second read-write head on said given track of said medium simultaneously with said step of reading the clock information performed by said first read-write head so that a new reference clock may be accomplished within as low as three revolutions and independent of a motor speed.

8. The method of claim 7 where said tracking is performed by a phase locked loop device.

9. The method of claim 8 where said rotating medium is a magnetic disk.

10. The method of claim 7 where said modifying is performed by a direct digital synthesis system.

11. The method of claim 10 where said rotating medium is a magnetic disk.

12. An apparatus for writing a reference clock track on a rotating magnetic medium having a plurality of tracks for reading and writing the information, said reference clock track having a write starting point and a write ending point and an unwritten portion between said write starting point and said write ending point, said apparatus comprising:

at least two read-write heads, each capable of reading and writing information on said tracks;

a frequency tracking means for tracking the frequency of clock information written on said medium;

a gap measurement means for measuring the length of said unwritten portion between said write starting point and said ending point; and a frequency modifying means responsive to said gap measurement means and said frequency tracking means for modifying said frequency of clock information and independent of a motor speed.

13. The apparatus of claim 12 wherein said frequency tracking means comprises a phase-locked-loop device.

14. The apparatus of claim 13 wherein said phase locked loop device comprises an input which receives an external input signal and a feedback input signal a phase detector which detects a phase difference between said external input signal and said feedback input signal, said phase detector having an output;

an integrator connected in series with said phase detector, said integrator arranged to integrate signals from said output of said phase detector;

a voltage controlled oscillator having an input which receives an input signal and an output which generates an output signal, said voltage controlled oscillator connected in series with said integrator, said voltage controlled oscillator capable of generating said output signal with a frequency dependent on said input signal; and a programmable divider having an input and an output, said programmable divider connected between said output of said voltage controlled oscillator and said input of said phase detector, said programmable divider dividing the said frequency on its said input.

15. The apparatus of claim 14 wherein said frequency modifying means is a direct digital synthesis system.

16. The apparatus of claim 15 wherein said gap measurement means is a timing interval measurement system.

17. An apparatus for writing a reference clock track on a rotating magnetic medium having a plurality of tracks for reading and writing the information, said reference clock track having a write starting point and a write ending point and an unwritten portion between said write starting point and said write ending point, said apparatus comprising:

at least two read-write heads, each capable of reading and writing information on said tracks;

a frequency tracking means for tracking a frequency of clock information written on said medium, said frequency tracking means having:

an input which receives an external input signal and a feedback input signal;

a phase detector which detects a phase difference between said external input signal and said feedback input signal, said phase detector having an output;

an integrator connected in series with said phase detector, said integrator arranged to integrate signals from said output of said phase detector;

a voltage controlled oscillator, having an input which receives an input signal and an output which generates an output signal, said voltage controlled oscillator connected in series with said integrator, said voltage controlled oscillator capable of generating said output signal with a frequency dependent on said input signal; and a programmable divider having an input and an output, said programmable divider connected between said output of said voltage controlled oscillator and said input of said phase detector, said programmable divider dividing the said frequency on its said input;

a gap measurement means for measuring the length of said unwritten portion between said write starting point and said write ending point; and a frequency modifying means responsive to said gap measurement means and said frequency tracking means for modifying said frequency of clock information and independent of a motor speed.

18. The apparatus of claim 17 wherein said frequency modifying means is a direct digital synthesis system.

19. The apparatus of claim 17 wherein said gap measurement means is a timing interval measurement system.

* * * * *